(12) United States Patent
Zhang et al.

(10) Patent No.: US 6,512,795 B1
(45) Date of Patent: Jan. 28, 2003

(54) ERROR CONCEALMENT FOR VIDEO SERVICES

(75) Inventors: Jian Zhang, Australian Capital Territory (AU); John Frederick Arnold, Australian Capital Territory (AU); Michael Robert Frater, Australian Capital Territory (AU)

(73) Assignees: Unisearch Limited, New South Wales (AU); Commonwealth Scientific and Industrial Research Organisation, Australian Capital Territory ( * ) Notice: Subject to any disclaimer, the term of this patent is extended or adjusted under 35 U.S.C. 154(b) by 0 days.

(21) Appl. No.: 09/508,546

(22) PCT Filed: Sep. 14, 1998

(86) PCT No.: PCT/AU98/00755

§ 371 (c)(1), (2), (4) Date: Jun. 26, 2000

(87) PCT Pub. No.: WO99/14950

PCT Pub. Date: Mar. 25, 1999

(30) Foreign Application Priority Data

Sep. 12, 1997 (AU) ............................................ PO 9185

(51) Int. Cl.⁷ ................................................. H04N 7/64

(52) U.S. Cl. ............................... 375/240.27; 375/240.15
(58) Field of Search ....................... 375/240.15, 240.27; H04N 7/64

(56) References Cited

U.S. PATENT DOCUMENTS

| | | | | |
|---|---|---|---|---|
| 5,442,400 A | | 8/1995 | Sun et al. ............... | 375/240.15 |
| 5,737,022 A | * | 4/1998 | Yamaguchi et al. ... | 375/240.27 |
| 5,912,707 A | * | 6/1999 | Kim ....................... | 375/240.27 |
| 6,046,784 A | * | 4/2000 | Lee ........................ | 375/240.27 |
| 6,128,339 A | * | 10/2000 | Park ....................... | 375/240.27 |
| 6,201,834 B1 | * | 3/2001 | Zhu ....................... | 375/240.27 |

FOREIGN PATENT DOCUMENTS

| | | |
|---|---|---|
| EP | 471580 A2 | 2/1992 |
| EP | 727910 A2 | 8/1996 |

* cited by examiner

*Primary Examiner*—Howard Britton
(74) *Attorney, Agent, or Firm*—Jordan and Hamburg LLP

(57) ABSTRACT

In compressed video signals, lost or erroneous information in a current image signal received at the receiving end of a transmission channel is concealed by identifying a motion compensated equivalent region in a previously transmitted image and substituting the equivalent region as a prediction of the lost or erroneous information in the current image.

36 Claims, 2 Drawing Sheets

ERROR CONCEALMENT FOR VIDEO SERVICES

INTRODUCTION

This invention relates to the field of visual services over a telecommunications network or on a storage system and in particular, the invention provides techniques for improved quality of compressed video signals when they are subject to loss or error by a telecomnunications network or storage system.

BACKGROUND

Digital video is of growing importance for many applications, including broadcast television services and interpersonal communications. There are several important international standards in this area, such as ISO/IEC MPEG 2 and ITU-T H.324, which enable interworking between a range of service providers and decoding equipment manufactured by different companies. These standards provide means for compressing and coding both video and audio data, and a packet-based multiplex that allows bitstreams from multiple video and/or audio sources to be carried on a single channel.

Errors introduced in the digital video bitstream by the transmission system cause the loss of video data, and lead to a range of obnoxious artefacts in the output video sequence unless effective action is taken by the decoder.

Prevention of these artefacts requires that errors be detected and that data that is in error or suspected of being in error be discarded. This can be achieved at the multiplexing layer by discarding packets that contain errors. Having discarded this data, it is then necessary to resynchronise and restart the decoding process, to localise the error (i.e. minimising propagation of errors) and to conceal the effects of the error.

Effective concealment is the key to providing a high-quality of service in the presence of transmission errors. It is also the only aspect of error resilience that is not defined by international standards. It is therefore necessary for each decoder manufacturer to develop their own methods.

One effective error concealment uses information from a previous video frame that has been received correctly and also takes into account the motion between this previous frame and the frame in which the loss has occurred. This type of concealment is known as "motion-compensated concealment". The key problem in motion-compensated concealment is to estimate reliably the motion, and it is in this area that previous technology is deficient.

Degradation of quality is also of concern in other image-based services. Archive photographic film, for example, deteriorates over time. Once again, restoration of quality can be achieved in image sequences such as movies by discarding the degraded region and using motion-compensated concealment. Once again, previous technology does not provide sufficiently reliable motion estimation techniques.

SUMMARY OF THE INVENTION

For the purpose of this specification, the term "video signal" includes all representations of a sequence of pictures, coded in any manner, whether analog or digital, square, rectangular or of any other shape and compressed or not compressed and including photographic film as well as electrical and mechanical representations.

According to a first aspect the present invention provides a video processing system including:

a) error detection means arranged to detect errors in and/or loss of information in a primary video signal and to identify a particular picture and a region within the picture of the primary video signal containing each such error in or loss of information; and b) video signal processing means for producing a secondary video signal as an error concealed version of the primary video signal wherein regions of the primary video signal that do not contain errors in or loss of information are copied directly to the secondary signal from the primary signal and in which each error concealed region in the secondary signal corresponding to an error region in the primary signal containing errors in or loss of information is generated by means of motion-compensated prediction from a previous picture in the secondary video signal, the video signal processing means including error concealment means for generating each error concealed region in the secondary signal, the error concealment means being arranged to:

i) identify, in relation to each error region in the primary signal, a primary tag region of the current picture of the secondary signal located in a known location in close proximity to the respective error region:

ii) scan a previous picture of the secondary signal to locate a secondary tag region substantially identical to each primary tag region of the current picture;

iii) generate error concealed regions of the current picture of the secondary signal by identifying a substitution region located in the same relative location with respect to the secondary tag region as the error region of the current picture of the primary signal is located with respect to the primary tag region: and iv) copy the substitution region to the respective error region in the current picture of the secondary signal.

According to a second aspect the present invention provides a video processing system including:

a) error detection means arranged to detect errors in and/or loss of information in a primary compressed digital video signal and to identify macroblocks within the primary video signal containing each such error in or loss of information; and b) video signal processing means for producing a secondary video signal as an error concealed version of the primary video signal. Wherein macroblocks within the primary video signal that do not contain errors in or loss of information are copied directly to the secondary signal from the primary signal and in which each error concealed macroblock in the secondary signal corresponding to an erroneous macroblock in the primary signal containing errors in or loss of information is generated by means of motion-compensated prediction from a previous picture in the secondary video signal, the video signal processing means including error concealment means for generating each error concealed macroblock in the secondary signal, the error concealment means being arranged to:

i) identify, in relation to each erroneous macroblock in the primary signal, a primary tag region of the current picture of the secondary signal located in a known location in close proximity to the respective erroneous macroblock;

ii) scan a previous picture of the secondary signal to locate a secondary tag region substantially identical to each primary tag region of the current picture:

iii) generate error concealed macroblocks of the current picture of the secondary signal by identifying a substitution macroblock located in the same relative location with respect to the secondary tag region as the erroneous macroblock of the current picture of the primary signal is located with respect to the primary tag region: and iv) copy the substitution macroblock to the macroblock in the current picture of the secondary signal corresponding to the respective erroneous macroblock in the primary signal.

According to a third aspect the present invention provides a method of processing a video signal including the steps of:

a) detecting errors in and/or loss of information in a primary video signal and identifying a particular picture and a region within the picture of the primary video signal containing each such error in or loss of information: and producing a secondary video signal as an error concealed version of the primary video signal, wherein regions of the primary video signal that do not contain errors in or loss of information are copied directly to the secondary signal from the primary signal, and each error concealed region in the secondary signal corresponding to an error region in the primary signal containing errors in or loss of information is generated by means of motion-compensated prediction from a previous picture in the secondary video signal, each error concealed region in the secondary signal being generated by the further steps of:

i) identifying, in relation to each error region in the primary signal, a primary tag region of the current picture of the secondary signal located in a known location in close proximity to the respective error region:

ii) scanning a previous picture of the secondary signal to locate a secondary tag region substantially identical to each primary tag region of the current picture;

iii) generating error concealed regions of the current picture of the secondary signal by identifying a substitution region located in the same relative location with respect to the secondary tag region as the error region of the current picture of the primary signal is located with respect to the primary tag region: and iv) copying the substitution region to the respective error region in the current picture of the secondary signal.

According to a fourth aspect the present invention provides a method of processing a video signal including the steps of:

a) detecting errors in and/or loss of information in a primary compressed digital video signal and identifying macroblocks within the primary video signal containing each such error in or loss of information; and b) producing a secondary video signal as an error concealed version of the primary video signal, wherein macroblocks within the primary video signal that do not contain errors in or loss of information are copied directly to the secondary signal from the primary signal and in which each error concealed macroblock in the secondary signal corresponding to an erroneous macroblock in the primary signal containing errors in or loss of information is generated by means of motion-compensated prediction from a previous picture in the secondary video signal, each error concealed macroblock in the secondary signal, being generated by:

i) identifying, in relation to each erroneous macroblock in the primary signal, a primary tag region of the current picture of the secondary signal located in a known location in close proximity to the respective erroneous macroblock;

ii) scanning a previous picture of the secondary signal to locate a secondary tag region substantially identical to each primary tag region of the current picture;

iii) generating error concealed macroblocks of the current picture of the secondary signal by identifying a substitution macroblock located in the same relative location with respect to the secondary tag region as the erroneous macroblock of the current picture of the primary signal is located with respect to the primary tag region: and iv) copying the substitution macroblock to the macroblock in the current picture of the secondary signal corresponding to the respective erroneous macroblock in the primary signal.

BRIEF DESCRIPTION OF THE DRAWINGS

Embodiments of the present invention will now be described by way of example with reference to the accompanying drawings in which.

DETAILED DESCRIPTION OF THE PREFERRED EMBODIMENTS

Figure 1:
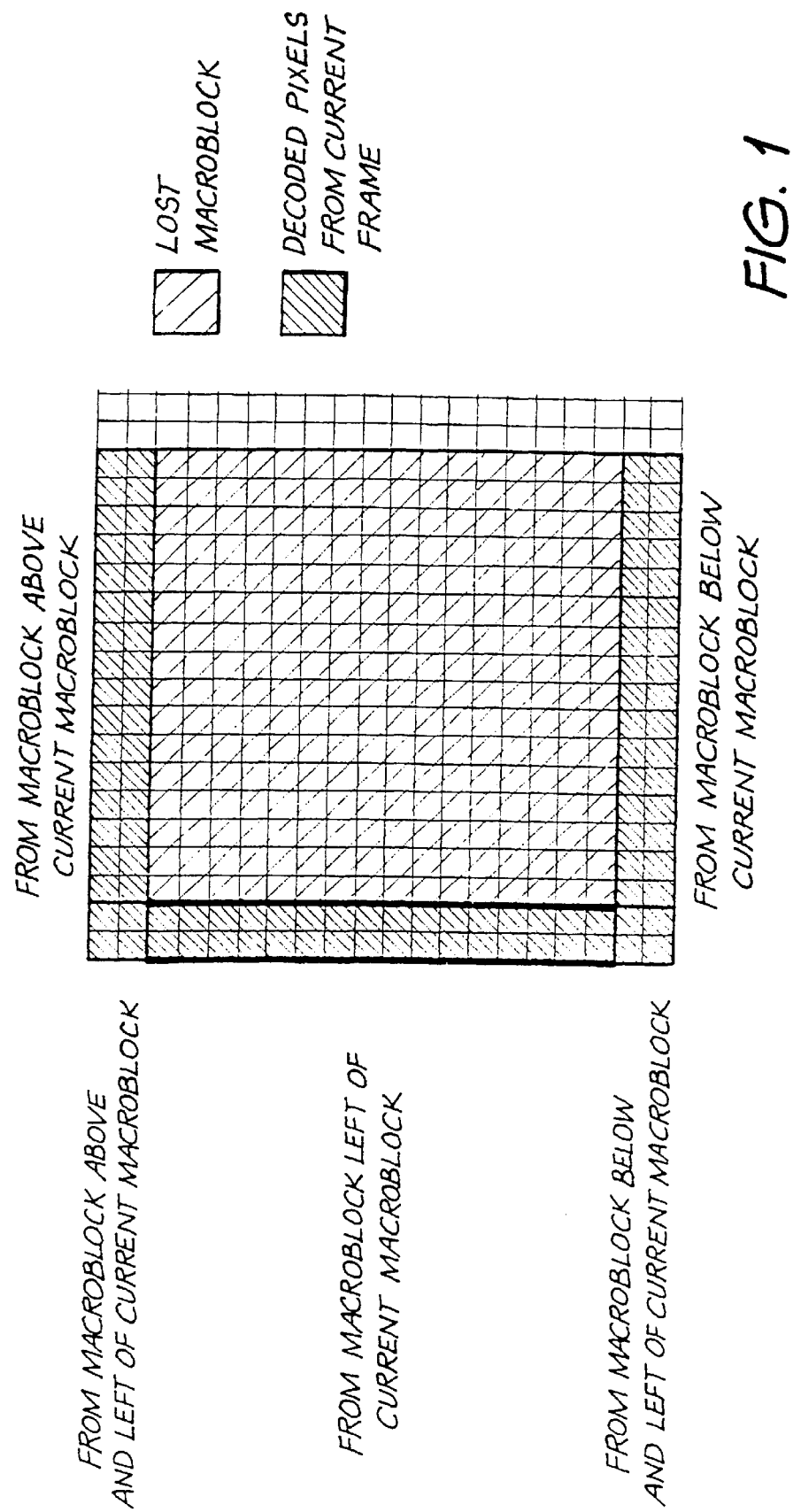
FIG. 1 illustrates the pixels used in the motion estimation in one embodiment of the present invention.

In the last decade, audio-visual services have grown beyond their traditional applications in broadcast television to include a large range of interactive services, such as videoconferencing. This growth of point to point, as opposed to broadcast, applications has led to demand from users to reduce the cost of transmitting these services. Fortunately, there have been technological advances that permit higher quality services to be delivered using the same resources, or, alternatively, a service of a given quality to be delivered using less resources (and therefore to be delivered more cheaply). One of the significant advances has been the development of the digital approach, in which both the video and audio signals are represented as a sequence of binary numbers.

When audio-visual services are transmitted on digital communications systems, it is necessary to apply compression techniques in order that the amount of information to be transmitted is not beyond the capacity of the network. These techniques are all based on removing the redundant information. For example, video consists of a sequence of pictures, each of which is represented by a number of pixels. Each pixel represents the brightness and colour information at a particular point in the frame. However, adjacent pixels tend to be very similar. Also, pixels in the same location in different pictures that are closely spaced in time tend be similar. By taking advantage of this sameness, it is possible to transmit video information more efficiently. Furthermore, it is not necessary that an exact copy of the video signal be transmitted, since most video contains detail that the human eye cannot see. This observation leads to another method by which compression can be achieved: throwing away information that is not perceptually important.

Most modern video coders use motion estimation to form a motion-compensated prediction of the video frame to be encoded. This technique effectively exploits temporal redundancy within the sequence. Next, the Discrete Cosine Transform (DCT) is employed to small blocks of data (usually 8×8 pixels) within the difference image produced by subtracting the motion compensated prediction from the video frame. The DCT both removes any remaining spatial redundancy in the difference image and also compacts the remaining energy into a relatively few DCT coefficients. The DCT coefficients are then quantised (rounded) and entropy coded (common values are coded with a short codeword while less likely coefficients are coded with longer codewords) prior to transmission to the decoder.

In many applications, errors can be introduced into a video signal when it is either transmitted over a telecommunications network or stored. These errors cause degradation of the received video quality. This degradation can be significantly reduced by the application of effective concealment techniques.

Embodiments of the present invention aim to accurately estimate the motion vector of any lost macroblocks using correctly received information at the decoder. This is achieved by carrying out a process similar to the motion estimation process performed at the encoder in order to determine the missing motion vector.

When an error or loss of information occurs, pixels surrounding the region of error and/or loss are taken. In the preferred implementation associated with a macroblock-based video coding scheme, two or more lines of information around any lost macroblocks are taken. This includes available information in the macroblock above the lost macroblock, the macroblock to the left of the lost macroblock and the macroblock above and to the left of the lost macroblock (even if these macroblocks are themselves concealed macroblocks). FIG. 1 illustrates the location of the relevant two lines of pixels in the macroblocks closest to the lost macroblock.

The algorithm then performs a full search within the previous picture for the best match to the available lines of decoded pixels from the current picture in the sense of minimising the mean absolute difference between the pixels in the current and previous frames. The macroblock of data which is surrounded by the lines which best match the lines from the current picture is assumed to be the best match to the lost macroblock. Motion vectors may be estimated to either full or half pixel accuracy. In the preferred implementation a search to full pixel accuracy is performed first, followed by a search to half pixel accuracy within +/−0.5 pixel of the best match in the full-pixel search.

This method can be applied to regions of error and/or loss of arbitrary shape. The shape of the region of pixels external to this area may also be of arbitrary shape. The region of pixels used in the search would usually be adjacent to the area or error and/or loss but may be located anywhere in the picture. In the example shown in FIG. 1, pixels from the macroblocks below and below and to the left of the lost macroblock could also be used in the motion search. So long as these macroblocks are received correctly.

Implementations of the motion search may use criteria other than minimising the mean absolute difference between pixels in the current and previous frames. Other suitable criteria include minimising mean squared difference, maximising the cross correlation and maximising the phase correlation.

The method may be simplified by replacing the full search with a fast search technique. In one such technique, only particular candidate motion vectors are investigated:

the motion vector for the same macroblock in the previous picture;

the motion vectors associated with available neighbouring macroblocks;

the median of the available neighbouring macroblocks;

the average of the available neighbouring macroblocks;

the zero motion vector.

The search is performed at each of these candidate locations in the same manner as each step of the full search.

Figure 2:
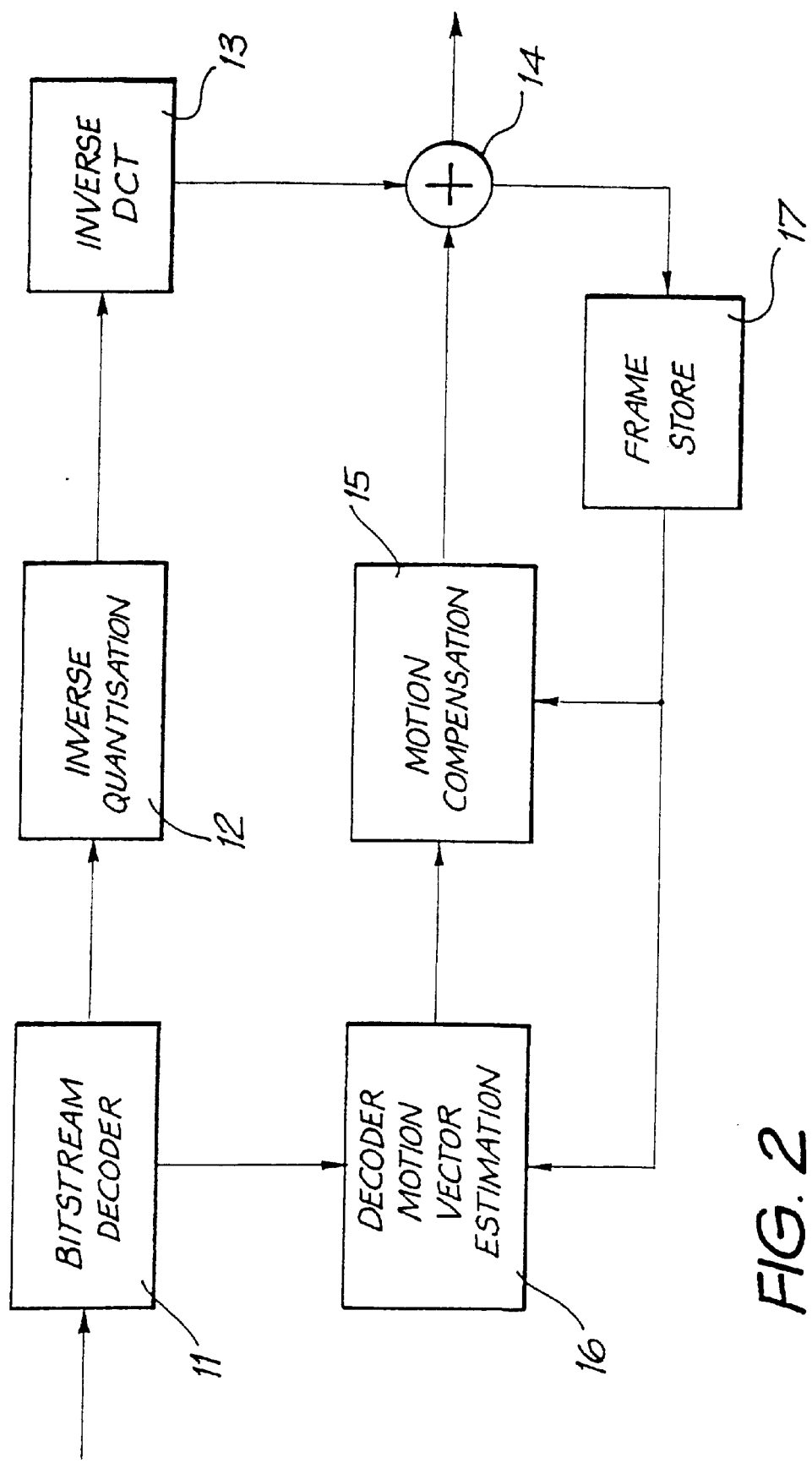
FIG. 2 is a block diagram of an embodiment of the present invention.

The block diagram of FIG. 2 shows one possible implementation of the principles of the present invention. A video bitstream arrives at the Bitstream Decoder block 11. Motion information and an indication of whether an error or loss has been detected is passed to the Decoder Motion Vector Estimation block 16. Quantised discrete cosine transform coefficients are passed to the Inverse Quantisation block 12.

The Inverse Quantisation block 12 converts the quantised discrete cosine transform coefficients to Discrete Cosine Transform coefficients and passes these coefficients to the Inverse Discrete Cosine Transform block 13.

The Inverse Discrete Cosine Transform block 13 performs the inverse Discrete Cosine Transform operation, and passes data in the pixel domain to the summation block 14. For the ability of the receivers to tolerate errors. For video services, provision of effective error robustness, and especially error concealment in the decoder permits effective service delivery in otherwise unacceptable propagation conditions. Such an approach has application in both terrestrial broadcast and satellite systems.

Congestion in packet networks, including those based on TCP/IP and the newer ATM technology, can lead to packets being lost or arriving at the decoder too late to be used. Effective error resilience as provided by the embodiments of the present invention in a video decoder enables operation in otherwise unacceptable congestion, and potentially reduces the importance of controlling packet loss in network management.

Because it is implemented solely in the decoder, the present invention can be implemented in conjunction with any video transmission or storage system where that video consists of frames, which are two dimensional arrays of pixels. This includes all current standards for video compression and coding, such as ISO/IEC MPEG 1 and MPEG 2 and ITU-T H.261 and H.263. It also includes future standards, such as ISO/IEC MPEG 4. Furthermore, the fact that this technique employs motion estimation and compensation requires neither that the coding used for transmission and/or storage of the video signal employed motion estimation and compensation nor even that this coding was block based.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A video processing system including:

a) error detection means arranged to detect errors in and/or loss of information in a primary video signal and to identify a particular picture and a region within the picture of the primary video signal containing each such error in or loss of information; and b) video signal processing means for producing a secondary video signal as an error concealed version of the primary video signal, wherein regions of the primary video signal that do not contain errors in or loss of information are copied directly to the secondary signal from the primary signal and in which each error concealed region in the secondary signal corresponding to an error region in the primary signal containing errors in or loss of information is generated by means of motion-compensated prediction from a previous picture in the secondary video signal, the video signal processing means including error concealment means for generating each error concealed region in the secondary signal, the error concealment means including:

i) identification means for identifying, in relation to each error region in the primary signal, a primary tag region of the current picture of the secondary signal located in a known location in close proximity to the respective error region;

ii) scanning means for scanning a previous picture of the secondary signal to locate a secondary tag region substantially identical to each primary tag region of the current picture;

iii) prediction means for generating error concealed regions of the current picture of the secondary signal by identifying a substitution region located in the same relative location with respect to the secondary tag region as the error region of the current picture of the primary signal is located with respect to the primary tag region; and iv) copying means for copying the substitution region to the respective error region in the current picture of the secondary signal.

2. The video processing system of claim 1 wherein the video signal processing means first generates in the secondary signal those regions that are error free in the primary signal.

3. The video processing system of claim 2 wherein after the video processing means has produced the error free regions, it identifies tag regions in the primary signal relative to each error containing region.

4. The video processing system of claim 3 wherein for each tag region a corresponding tag region is identified in the previous picture of the secondary signal, and a region relative to each tag region is identified as the motion compensated predication of the respective error region of the current picture of the primary signal.

5. The video processing system of claim 4 wherein, for each tag region, the motion compensated prediction of the corresponding error containing region is determined before identifying the next tag region.

6. The video processing system of claim 4 wherein all of the tag regions are identified before any of the motion compensated predictions are determined.

7. The video processing system as claimed in claim 1 wherein the error region is divided into a plurality of subregions, each having a corresponding tag region and a separate motion compensated prediction being determined for each error containing region.

8. The video processing system as claimed in claim 1 wherein each tag region is immediately adjacent to the respective error containing region.

9. The video processing system of claim 8 wherein each tag region comprises one or more rows of pixels along one or more edges of the respective error containing region.

10. A video processing system including:

a) error detection means arranged to detect errors in and/or loss of information in a primary compressed digital video signal and to identify macroblocks within the primary video signal containing each such error in or loss of information; and b) video signal processing means for producing a secondary video signal as an error concealed version of the primary video signal, wherein macroblocks within the primary video signal that do not contain errors in or loss of information are copied directly to the secondary signal from the primary signal and in which each error concealed macroblock in the secondary signal corresponding to an erroneous macroblock in the primary signal containing errors in or loss of information is generated by means of motion-compensated prediction from a previous picture in the secondary video signal, the video signal processing means including error concealment means for generating each error concealed macroblock in the secondary signal, the error concealment means including:

i) identification means for identifying, in relation to each erroneous macroblock in the primary signal, a primary tag region of the current picture of the secondary signal located in a known location in close proximity to the respective erroneous macroblock;

ii) scanning mans for scanning a previous picture of the secondary signal to locate a secondary tag region substantially identical to each primary tag region of the current picture;

iii) prediction means for generating error concealed macroblocks of the current picture of the secondary signal by identifying a substitution macroblock located in the same relative location with respect to the secondary tag region as the erroneous macroblock of the current picture of the primary signal is located with respect to the primary tag region; and iv) copying means for copying the substitution macroblock to the macroblock in the current picture of the secondary signal corresponding to the respective erroneous macroblock in the primary signal.

11. The video processing system of claim 10 wherein the video signal processing means first generates in the secondary signal those regions that are error free in the primary signal.

12. The video processing system of claim 11 wherein after the video processing means has produced the error free regions, it identifies tag regions in the primary signal relative to each error containing macroblock.

13. The video processing system of claim 12 wherein for each tag region a corresponding tag region is identified in the previous picture of the secondary signal and a region relative to each tag region is identified as the motion compensated predication of the respactive error region of the current picture of the primary signal.

14. The video processing system of claim 13 wherein for each tag region the motion compensated prediction of the corresponding error macroblock is determined before identifying the next tag region.

15. The video processing system of claim 13 wherein all of the tag regions are identified before any of the motion compensated predictions are determined.

16. The video processing system as claimed in claim 10 wherein the error containing macroblock is divided into a plurality of subregions, each having a corresponding tag region and a separate motion compensated prediction being determined for each error containing macroblock.

17. The video processing system as claimed in claim 10 wherein each tag region is immediately adjacent to the respective error containing macroblock.

18. The video processing system of claim 17 wherein each tag region comprises one or more rows of pixels along one or more edges of the respective error containing macroblock.

19. A method of processing a video signal including the steps of:
a) detecting errors in and/or loss of information in a primary video signal and identifying a particular picture and a region within the picture of the primary video signal containing each such error in or loss of information; and
b) producing a secondary video signal as an error concealed version of the primary video signal, wherein regions of the primary video signal that do not contain errors in or loss of information are copied directly to the secondary signal from the primary signal, and each error concealed region in the secondary signal corresponding to an error region in the primary signal containing errors in or loss of information is generated by means of motion-compensated prediction from a previous picture in the secondary video signal, each error concealed region in the secondary signal being generated by the further steps of:
i) identifying, in relation to each error region in the primary signal, a primary tag region of the current picture of the secondary signal located in a known location in close proximity to the respective error region;
ii) scanning a previous picture of the secondary signal to locate a secondary tag region substantially identical to each primary tag region of the current picture;
iii) generating error concealed regions of the current picture of the secondary signal by identifying a substitution region located in the same relative location with respect to the secondary tag region as the error region of the current picture of the primary signal is located with respect to the primary tag region; and
iv) copying the substitution region to the respective error region in the current picture of the secondary signal.

20. The method of claim 19 wherein the video signal processing means first generates in the secondary signal those regions that are error free in the primary signal.

21. The method of claim 20 wherein after the video processing means has produced the error free regions, it identifies tag regions in the primary signal relative to each error containing region.

22. The method of claim 21 wherein for each tag region a corresponding tag region is identified in the previous picture of the secondary signal, and a region relative to each tag region is identified as the motion compensated predication of the respective error region of the current picture of the primary signal.

23. The method of claim 22 wherein for each tag region the motion compensated prediction of the corresponding error containing region is determined before identifying the next tag region.

24. The method of claim 22 wherein all of the tag regions are identified before any of the motion compensated predictions are determined.

25. The method as claimed in claim 19 wherein the error region is divided into a plurality of subregions, each having a corresponding tag region and a separate motion compensated prediction being determined for each error region.

26. The method as claimed in claim 19 wherein each tag region is immediately adjacent to the respective error containing region.

27. The method of claim 26 wherein each tag region comprises one or more rows of pixels along one or more edges of the respective error containing region.

28. A method of processing a video signal including the steps of:
a) detecting errors in and/or loss of information in a primary compressed digital video signal and identifying macroblocks within the primary video signal containing each such error in or loss of information; and
b) producing a secondary video signal as an error concealed version of the primary video signal, wherein macroblocks within the primary video signal that do not contain errors in or loss of information are copied directly to the secondary signal from the primary signal and in which each error concealed macroblock in the secondary signal corresponding to an erroneous macroblock in the primary signal containing errors in or loss of information is generated by means of motion-compensated prediction from a previous picture in the secondary video signal, each error concealed macroblock in the secondary signal, being generated by:
i) identifying, in relation to each erroneous macroblock in the primary signal, a primary tag region of the current picture of the secondary signal located in a known location in close proximity to the respective erroneous macroblock;
ii) scanning a previous picture of the secondary signal to locate a secondary tag region substantially identical to each primary tag region of the current picture;
iii) generating error concealed macroblocks of the current picture of the secondary signal by identifying a substitution macroblock located in the same relative location with respect to the secondary tag region as the erroneous macroblock of the current picture of the primary signal is located with respect to the primary tag region; and
iv) copying the substitution macroblock to the macroblock in the current picture of the secondary signal corresponding to the respective erroneous macroblock in the primary signal.

29. The method of claim 28 wherein the video signal processing means first generates in the secondary signal those macroblocks that are error free in the primary signal.

30. The method of claim 29 wherein after the video processing means has produced the error free regions, it identifies tag regions in the primary signal relative to each error containing macroblock.

31. The method of claim 30 wherein for each tag region a corresponding tag region is identified in the previous picture of the secondary signal, and a region relative to each tag region is identified as the motion compensated predication of the respective error region of the current picture of the primary signal.

32. The method of claim 31 wherein for each tag region the motion compensated prediction of the corresponding error macroblock is determined before identifying the next tag region.

33. The method of claim 31 wherein all of the tag regions are identified before any of the motion compensated predictions are determined.

34. The method as claimed in claim 28 wherein the error containing macroblock is divided into a plurality of subregions, each having a corresponding tag region and a separate motion compensated prediction being determined for each error containing macroblock.

35. The method as claimed in claim 28 wherein each tag region is immediately adjacent to the respective error containing macroblock.

36. The method of claim 35 wherein each tag region comprises one or more rows of pixels along one or more edges of the respective error containing macroblock.

* * * * *